United States Patent
Lowry et al.

(10) Patent No.: US 8,423,656 B2
(45) Date of Patent: Apr. 16, 2013

(54) PUSH GATEWAY SYSTEMS AND METHODS

(75) Inventors: Adam C Lowry, Portland, OR (US);
Jared J Kuolt, Portland, OR (US);
Steven L Osborn, II, Hillsboro, OR (US)

(73) Assignee: Urban Airship, Inc., Portland, OR (US)

( * ) Notice: Subject to any disclaimer, the term of this patent is extended or adjusted under 35 U.S.C. 154(b) by 0 days.

(21) Appl. No.: 13/326,294

(22) Filed: Dec. 14, 2011

(65) Prior Publication Data

US 2012/0324022 A1  Dec. 20, 2012

Related U.S. Application Data

(63) Continuation of application No. 13/160,213, filed on Jun. 14, 2011.

(51) Int. Cl.
*G06F 15/16* (2006.01)
(52) U.S. Cl.
USPC ........ 709/229; 709/227; 709/228; 455/412.1; 455/412.2
(58) Field of Classification Search .......... 709/227–229; 455/412.1–412.2
See application file for complete search history.

(56) References Cited

U.S. PATENT DOCUMENTS

| | | | |
|---|---|---|---|
| 6,421,781 B1 | 7/2002 | Fox et al. | |
| 6,763,384 B1* | 7/2004 | Gupta et al. | 709/224 |
| 7,769,868 B2* | 8/2010 | Mishra et al. | 709/227 |
| 8,064,896 B2 | 11/2011 | Bell et al. | |
| 2004/0024880 A1* | 2/2004 | Elving et al. | 709/227 |
| 2004/0068665 A1* | 4/2004 | Fox et al. | 713/201 |
| 2005/0135306 A1* | 6/2005 | McAllen et al. | 370/329 |
| 2006/0173959 A1 | 8/2006 | McKelvie et al. | |
| 2007/0156869 A1* | 7/2007 | Galchev et al. | 709/223 |
| 2007/0160070 A1* | 7/2007 | Buchhop et al. | 370/401 |
| 2007/0255957 A1* | 11/2007 | Arnone et al. | 713/182 |
| 2008/0003996 A1* | 1/2008 | Strandell et al. | 455/420 |
| 2008/0046995 A1* | 2/2008 | Satterlee et al. | 726/15 |
| 2009/0158397 A1* | 6/2009 | Herzog et al. | 726/4 |
| 2009/0204666 A1* | 8/2009 | Sana et al. | 709/203 |
| 2010/0094985 A1* | 4/2010 | Abu-Samaha et al. | 709/223 |
| 2010/0138501 A1* | 6/2010 | Clinton et al. | 709/206 |
| 2011/0029598 A1 | 2/2011 | Arnold et al. | |
| 2011/0173681 A1 | 7/2011 | Qureshi et al. | |
| 2011/0208869 A1* | 8/2011 | Abu-Samaha et al. | 709/228 |
| 2011/0217953 A1* | 9/2011 | O'Reilly | 455/412.1 |
| 2011/0225298 A1* | 9/2011 | Brown et al. | 709/226 |
| 2011/0252240 A1 | 10/2011 | Freedman et al. | |

\* cited by examiner

*Primary Examiner* — Duyen Doan
(74) *Attorney, Agent, or Firm* — Van Pelt, Yi & James LLP

(57) ABSTRACT

A push gateway includes a number of socket servers, a queue server, and arbiter serving, a mapping server and a number of worker servers. Each of the socket servers and the arbiter server includes a network interface. The queue server is coupled to the socket servers for bidirectional communication with the socket servers. The mapping server is coupled to the arbiter server and to the socket servers for bidirectional communication with the arbiter server and each of the socket servers. The worker servers are coupled to the queue serer and the mapping server. The arbiter server is configured to facilitate communications over a network with the worker servers by at least partially balancing loads on the number of socket servers based, at least in part, upon the mapping server.

17 Claims, 7 Drawing Sheets

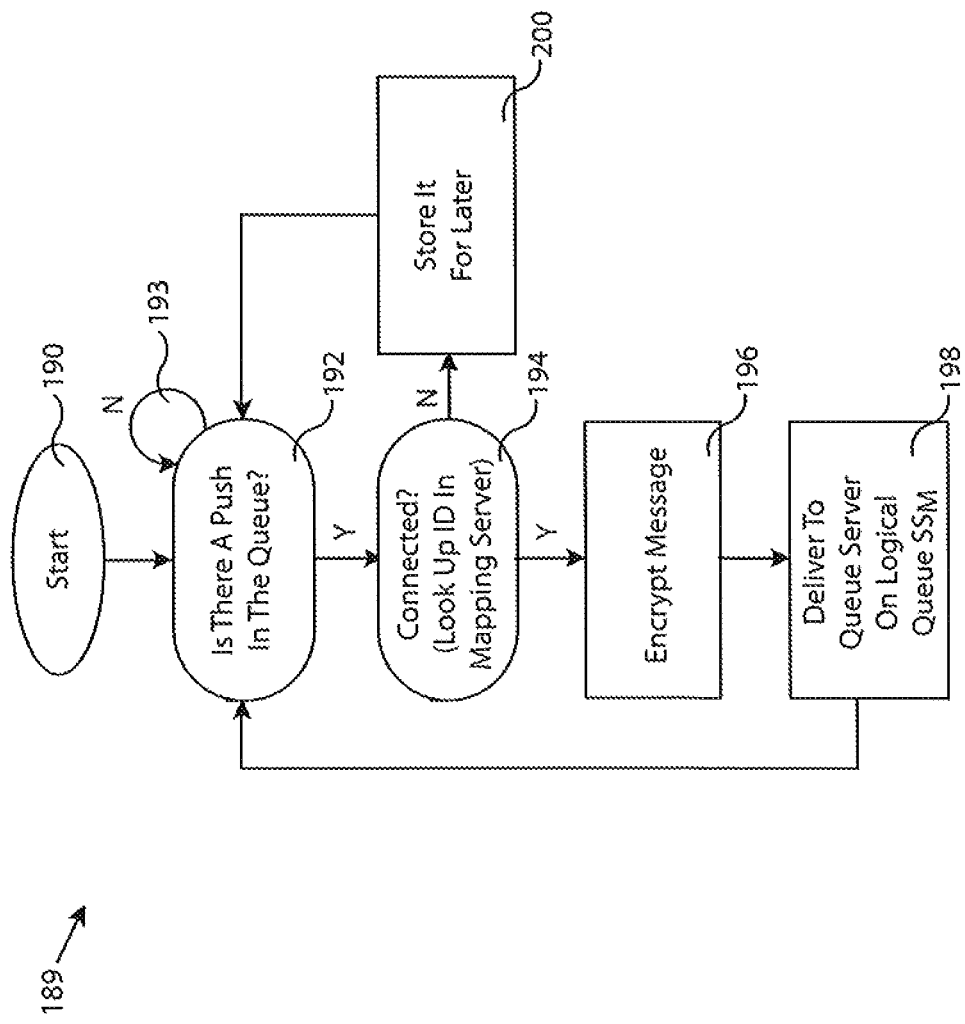

PUSH GATEWAY SYSTEMS AND METHODS

CROSS REFERENCE TO RELATED APPLICATIONS

This application is a continuation of U.S. Ser. No. 13/160,213, filed Jun. 14, 2011, and is related to: U.S. Ser. No. 13/160,190, filed Jun. 14, 2011, U.S. Ser. No. 13/160,226, filed Jun. 14, 2011, and Ser. No. 13,326,269, filed Dec. 14, 2011, all of which are incorporated herein by reference.

BACKGROUND

Push technology (aka "server push") is a type of Internet-based communication where the request for a given transaction is initiated by a "publisher" or server. It is contrasted with pull technology where the request for transmission of information is initiated by a receiving device or "client."

Push services are sometimes based upon information preferences expressed in advance. This is referred to as a "publish/subscribe" model. For example, a client might subscribe one or more information "channels." The server associated with the channels can then push information to the client when new content becomes available.

There are many types of push services. For example, synchronous conferencing and instant messaging are forms of push services. Increasingly popular are push-enabled web applications including market data distribution (e.g. stock tickers), online chat/messaging systems (e.g. "webchat"), auctions, online betting and gambling, sports results, monitoring consoles and sensor network monitor.

There are also hybrid push/pull systems. For example, email begins as a push system in that the SMTP protocol upon which it is based is a push protocol. However, the last step in the delivery of an email, e.g. from a mail server to a desktop computer, typically uses a pull protocol such as POP3 or IMAP.

As will be appreciated, there are many and widespread uses for push technology. However, one drawback of such technology is that there is no little or no feedback to the publisher as to how the pushed information is being used or, in some cases, if the information was even successfully received. Therefore, push technology tends to be a one-way form of communication from publisher to client without the benefit of feedback from the client.

Push gateways are used, for example, to push messages to cellular telephones. In many cases, push gateways are proprietary. For example, push gateways for the iPhone® are proprietary to Apple, Inc. Cellular telephone gateway technologies for other companies, such as for the popular Android® cellular technologies of Google, Inc. are open source such that third parties may make their own version of Android gateways. Nonetheless, current gateways are one-way systems which push messages to the cellular telephones without receiving feedback regarding pushes.

These and other limitations of the prior art will become apparent to those of skill in the art upon a reading of the following descriptions and a study of the several figures of the drawing.

SUMMARY

By way of example and not limitation, a push gateway includes a number of socket servers, a queue server, and arbiter server, a mapping server and a number of worker servers. Each of the socket servers and the arbiter server includes a network interface. The queue server is coupled to the socket servers for bidirectional communication with the socket servers. The mapping server is coupled to the arbiter server and to the socket servers for bidirectional communication with the arbiter server and each of the socket servers. The worker servers are coupled to the queue server and the mapping server. Advantageously, in this example, the arbiter server is configured to facilitate communications over a network with the worker servers by balancing loads on the number of socket servers based, at least in part, upon the mapping server.

By way of further example and not limitation, a method for a device to communicate with a push gateway over a network includes: attempting to connect over a network to a push gateway using a connection list if previously provided by the push gateway; communicating over the network with the push gateway if the attempt to connect was successful; and receiving a new connection list over the network from the push gateway if the attempt to connect was unsuccessful.

By way of still further example and not limitation, a method for operating a push gateway includes: sending over a network to a device coupled to the network a list of connections to a push gateway coupled to the network; connecting the device to the push gateway using a successful connection derived from the list of connections; and pushing at least one message to the device via the successful connection.

These and other examples, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 7 is a flow diagram of another example process implemented by a server.

DETAILED DESCRIPTION OF EXAMPLE EMBODIMENTS

Figure 1:
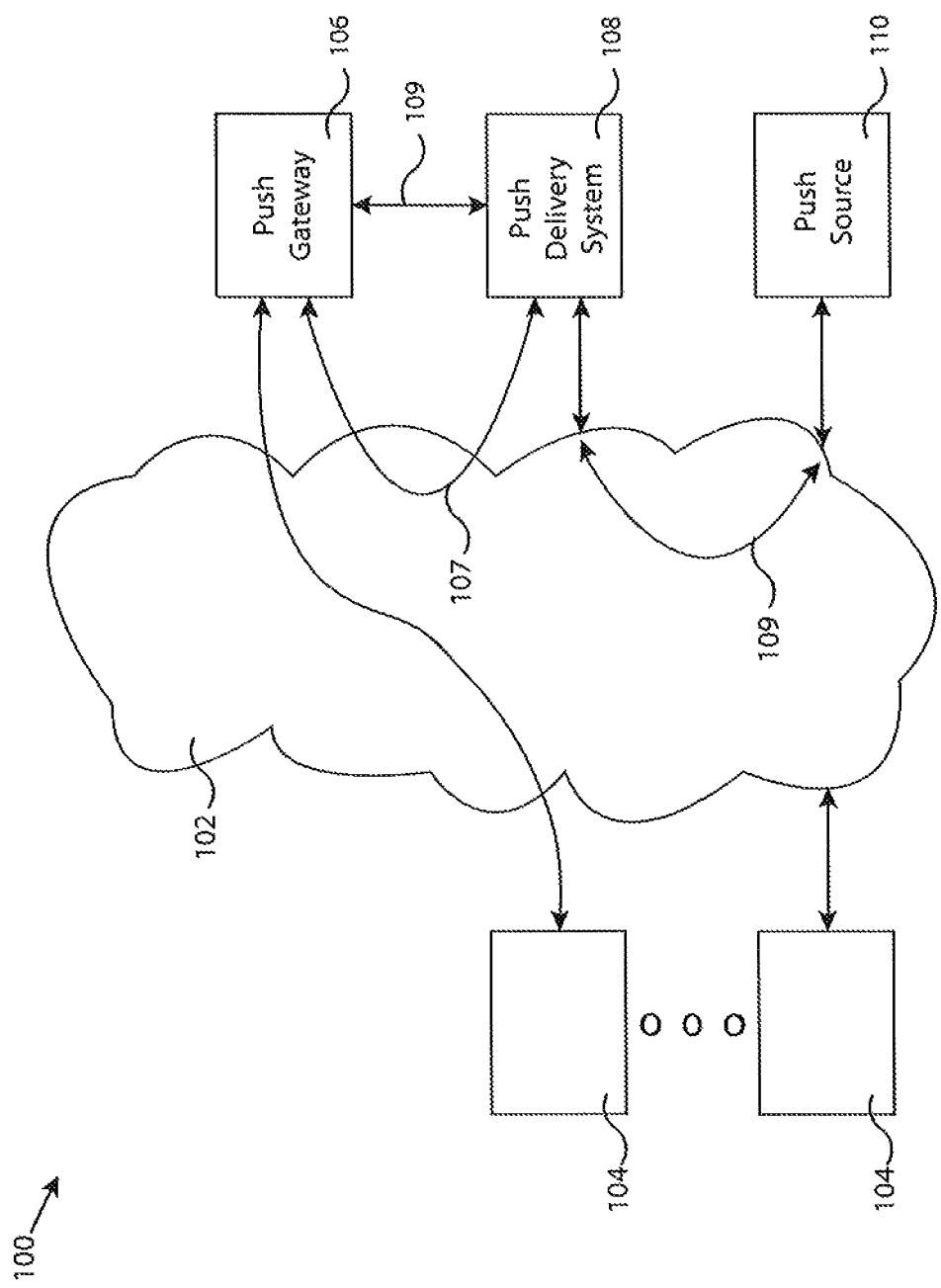
FIG. 1 is a block diagram of an example system for delivering push messages.

In FIG. 1, an example system 100 for delivering push messages utilizes a wide area network 102, e.g. the Internet, for bidirectional communications. A number of devices 104 are coupled to wide area network 102, and one or more push gateways 106 which are also coupled to wide area network 102, also for bidirectional communications.

System 100 further includes a push delivery system 108 which is coupled to wide area network 102 for bidirectional communications. Push delivery system 108 may, in certain example embodiments, communicate with push gateway 106 via wide area network 102 (as seen at 107), or via a separate network or connection (as seen at 109). System 100 for delivering push messages may cooperate with one or more push sources 110 which are coupled to the wide area network 102 for bidirectional communications.

In an example embodiment, system 100 establishes a bidirectional socket connection between device 104 and push gateway 106 which, once established, is used for communications regarding push notifications and related communications. For example, the socket connection may be implemented using stream sockets, also known as connection-oriented sockets, which use Transmission Control Protocol (TCP) or Stream Control Transmission Protocol (SCTP). It should be noted that in certain examples HTTPS protocol is used initially between device 104 and push gateway 106 to exchange information that is needed to establish the socket connection, so the socket connection may not include the totality of communications between device 104 and push gateway 106.

In a further example, a push source 110 initiates a push with a designated list of one or more recipient devices, and communicates via wide area network 102 with push delivery system 108 (as seen at 109) where the list of recipient devices is expanded and filtered. The push notification is forwarded to the devices via communication between push delivery system 108 and the push gateway 106 to the device(s) 104 via wide area network 102.

In certain example embodiments, the socket connection between device 104 and push gateway 106 is used to communicate the push message. In certain examples undeliverable push messages may be stored by push delivery system 108 or alternatively in push gateway 106 for later delivery to device 104. Example push delivery systems and their operation are discussed in U.S. Ser. No. 13/160,190 filed Jun. 14, 2011, entitled "Push Notification Delivery System," which has been incorporated herein by reference.

In certain example embodiments, push gateway 106 may be local to push delivery system 108 and communication between these may be achieved through a local area network or connection 109. In other example embodiments, the push gateway 106 may be non-local. For example, a push gateway 106 for Android mobile devices may be local, while the respective push gateways 106 for other types of devices (e.g. Apple IOS, etc.) may be not-local. Various alternative communication methods may be employed by push gateways 106. For example, push gateway 106 can be implemented as a web server.

Figure 2:
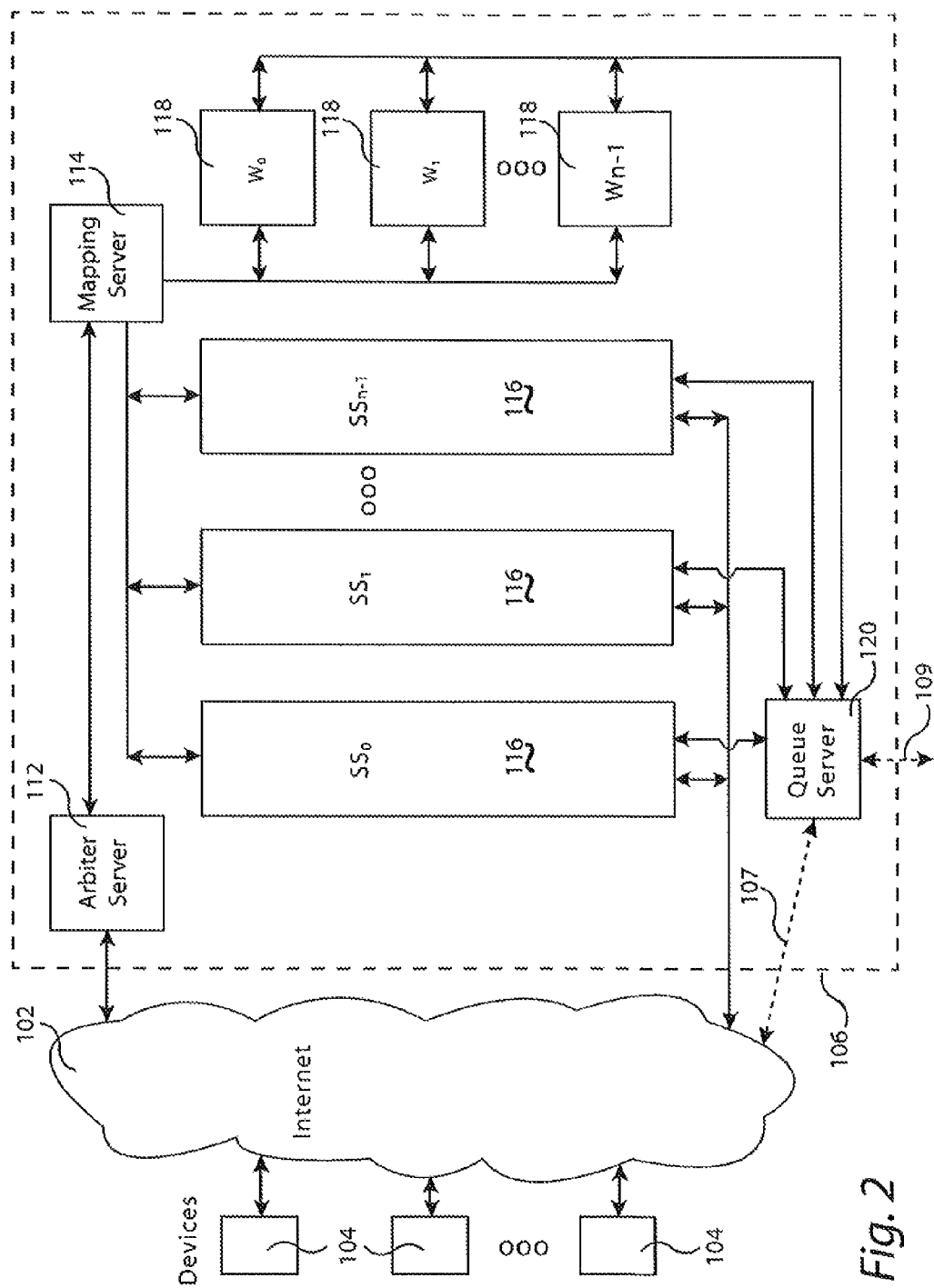
FIG. 2 is a block diagram illustrating an example push gateway of FIG. 1 in greater detail.

FIG. 2 depicts an example push gateway 106 of FIG. 1 in greater detail. As described earlier with reference to FIG. 1, push gateway 106 is coupled to devices 104 via wide area network 102. By way of example and not limitation, push gateway 106 includes an arbiter server 112, a mapping server 114, a number of socket servers 116, a number of worker servers 118, and a queue server 120.

Arbiter server 112 includes a network interface for bidirectional communication with device(s) 104 via wide area network 102 and, in certain examples, a second network interface for bidirectional communication with various components of push gateway 106 including, for example, mapping server 114. Mapping server 104 includes one or more interfaces for bidirectional communication with, for example, arbiter server 112, each of the socket servers 116, and each of the worker servers 118. Socket servers 116 include one or more interfaces for bidirectional communication with mapping server 114, queue server 120 and wide area network 102. Each of the worker servers 118 include one or more interfaces for bidirectional communications with, for example, mapping server 114, and queue server 120. Queue server 120 includes one or more interfaces for bidirectional communications with, for example, each of the socket servers 116 and each of the worker servers 118. Further, queue server 120 may be coupled to wide area network 102 (as seen at 107) for bidirectional communications with, for example, push delivery system 108 as illustrated in FIG. 1. Alternatively, queue server 120 may be coupled to push delivery system 108 via a local area network or other connection as seen at 109.

The arbiter server 112 is configured to facilitate bidirectional communications between devices 104 and worker servers 118 by balancing loads on the number of socket servers 116 based upon information obtained from the mapping server 114. Arbiter server 112 communicates with devices 104 to register a given device 104 (if it is not already registered) and to assign and provide to device 104 a secure ID which can be used to authenticate it in future communications with push gateway 106.

Arbiter server 106 further provides a list of the least burdened socket servers 116 to device(s) 104 which is derived from information obtained from mapping server 114. For example, a list of five socket servers 116 including their addresses on wide area network 102 may be provided to device 104 in ascending order of the extent to which they are burdened. Since these five socket servers 116 are the least burdened, they are more likely than other socket servers 116 to successfully open a socket connection to device 104.

The arbiter server also provides an encryption key to device 104 in certain examples. The encryption key and list of servers 116 may be, by non-limiting example, provided to the device once per day, and may be stored on the device. This tells the device 104 which of the socket servers 116 to use for that day, and what encryption key to use. Since the encryption key is refreshed once per day, in this non-limiting example, a measure of added security is achieved.

Mapping server 114 develops a map of potential connections to push gateway 106. This map is developed by receiving information from the number of socket servers 116 which give information about how "full" they are to mapping server 114. The map of potential connections developed by mapping server 114 is also accessed by the number of worker servers 118 which uses the map to identify which socket server 116 is maintaining the socket to a given device 104. This allows a worker server 118 to place, for example, push message information into the queue corresponding to the socket server 116 which has an open connection to the device 104. The queues are managed by queue server 120.

Queue server 120 manages queues for messaging between, for example, worker servers 118 and socket servers 116 or between push delivery system 108 (shown in FIG. 1 and not shown in FIG. 2) and worker servers 118. Push delivery system 108 feeds messages into queue server 120 which are subsequently picked up by worker servers 118, which performs encryption using the encryption key assigned to the device 104 delivers the message via the queue corresponding to the socket server 116 which is managing the connection to the device 104.

Socket servers 116 maintain socket connections to devices 104, and enqueue (via queue server 120) encrypted messages from devices 104 that are to be received by worker servers 118. Also, socket servers 116 monitor queue server 120 for encrypted messages from worker servers 118 that are to be forwarded to a specified device 104. Since there is a queue within socket server 120 for each socket server 116, the socket server 116 monitors this queue and passes on the messages to the devices 104 using the socket connection. The vast majority of the time, a given socket connection is idle and is maintained by way of "keep-alive" messages to make sure that that connection is still active.

In certain examples, the socket connection is not encrypted per se, but it can carry messages that are encrypted. Thus, the computational power needed to maintain a high number of connections and forward the associated messages is reduced since the burden of encryption and decryption is handled by the worker servers 118 and the devices 104. This can be advantageous because a given socket server 116 may typically maintain socket connections to half a million devices 104. In an alternate embodiment, the socket server 116 performs the encryption and decryption and subsumes the role of the worker server 118. Other divisions of labor between various servers and devices are also possible, as will be appreciated by those of skill in the art.

Figure 3:
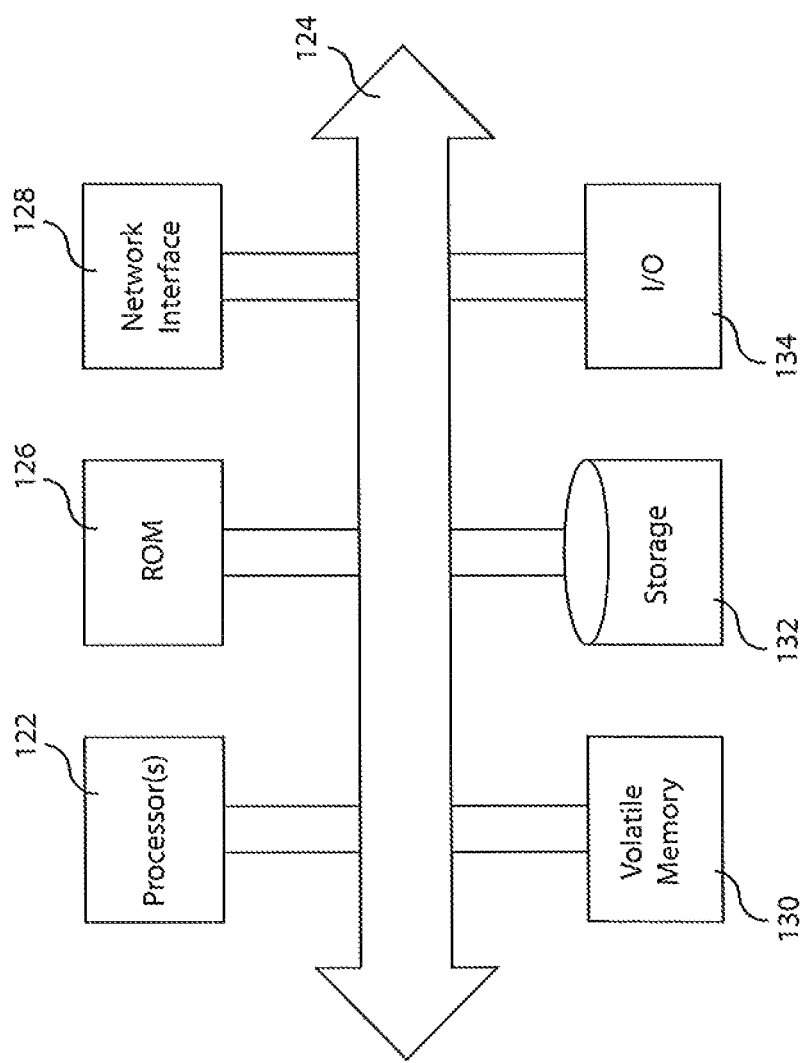
FIG. 3 is a block diagram of an example server system.

FIG. 3 is a block diagram depicting an example embodiment of a server system such as, for example, an arbiter server 106, a mapping server 114, a socket server 116, a worker server 118 or a queue server 120 of FIG. 2 which includes at least one processor 122, which may be a multi-core processor and may include a cache memory, coupled to a bus 124. Also coupled to bus 124 is a ROM 126 which typically contains program instructions including a BIOS of the server system of FIG. 3. A network interface 126 configured for bidirectional communications is coupled between bus 124 and a network (e.g. the Internet). Additional interfaces may be coupled to bus 124 to provide access to other networks, computers and/or devices, such as a local area network coupling two or more of an arbiter server 106, a mapping server 114, a socket server 116, a worker server 118 or a queue server 120 of FIG. 2.

Volatile memory 130 is coupled to bus 124 to act as a fast random access memory (RAM) of processor 122. In addition to processor 122, other devices coupled to bus 124 may access volatile memory 130 using, for example, DMA transfers. As used herein, "volatile memory" will refer to memory that loses data when its power source is removed.

Non-volatile memory 132 is, by way of non-limiting example, coupled to bus 124 and can serve as storage for the various program instructions and data for the server system of FIG. 3. As used herein, "non-volatile memory" shall refer to a non-volatile computer readable medium such as a hard disk drive, optical drive, flash memory or other computer readable memory which does not lose data when power is removed. In certain examples some or all of the non-volatile memory is remote or network attached storage.

Both volatile memory and non-volatile memory are examples of non-transitory computer readable media. As used herein, "non-transitory computer readable media" refers to a physical memory and excludes propagating electromagnetic waves, transitory signals and/or other forms of non-statutory subject matter in accordance with current USPTO protocols.

According to certain example embodiments, non-volatile memory 132 will store program instructions including an operating system for the server system of FIG. 3. The operating system may be UNIX, Linux, Windows, or another operating system, as will be appreciated by those of skill in the art. Further, a portion of the storage capacity of non-volatile memory 132 may be used to store one or more code segments and their associated data. Of course, operating system code segments, and other code segments may also be stored in volatile memory 130 for as long as it is provided with power.

I/O subsystem 134 is coupled to bus 124 and handles the various input and output operations of the server system of FIG. 3, which may include, by way of example and not limitation, output to a display, input from a keyboard, input from a pointing device, etc. Such devices may be coupled part-time to I/O subsystem 134. Such devices may also be coupled via network interface 128 and a network. This allows for remote control and monitoring of the server system of FIG. 3.

It should be noted that the server system of FIG. 3 may include multiple servers configured to implement the processes described herein. The server system depicted in FIG. 3 is but one example hardware configuration for a server system.

Figure 4:
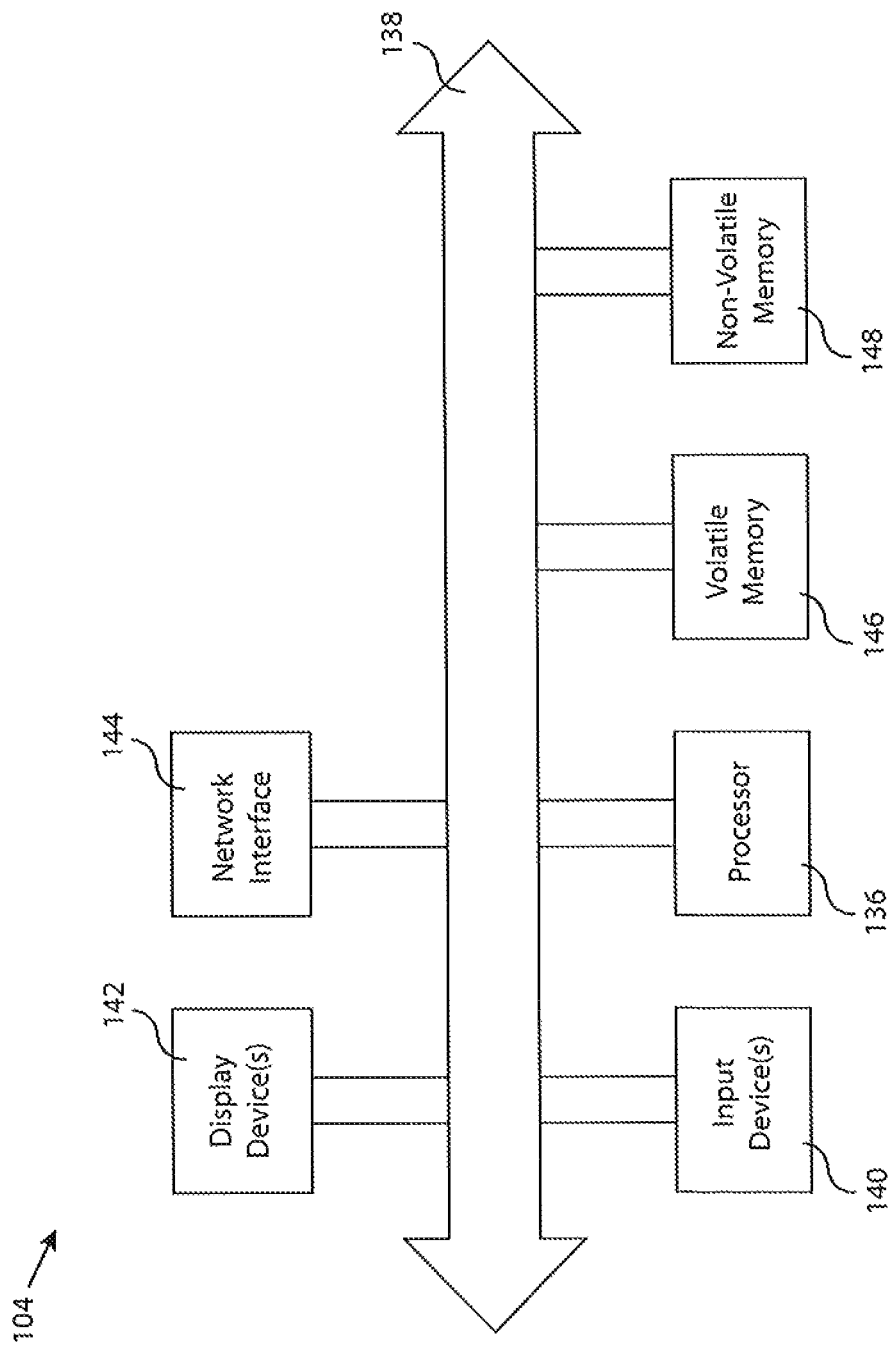
FIG. 4 is a block diagram of an example networkable device.

FIG. 4 is a block diagram depicting an example device 104 (such as a cell phone) of FIGS. 1 and 2. In this example, device. 104 includes a processor 136, which may be a multi-core processor and may include a cache memory, which is coupled to bus 138. Also coupled to bus 138, in this example, is input device subsystem 140 which includes various input devices, which may include, by way of example and not limitation, a pointing device, such as a touch screen, a keyboard input device, which may be physical or software generated (virtual), a microphone for audio input, a camera for the input of still images or video, and various other sensors. Input device subsystem 140 of device 104 may have more or fewer devices depending on design choice, cost, etc.

A display subsystem 142 of device 104 is coupled to bus 138 and may include, by way of example and not limitation, a flat panel display such as an LCD display, electronic paper display, etc., an adapter to drive other attachable displays, etc. Also, display subsystem 142 of device 104 may include an electro-acoustic transducer (aka "speaker" or "earphone") for audio output.

In this example, a network interface 144, coupled to bus 138, provides access to, for example, a cellular network or a wireless router. This is typically accomplished with a bidirectional RF digital communication link. A memory 146 serves, in this example, as a random access (RAM) memory of processor 124.

In addition to processor 124, other devices coupled to bus 138 may access memory 146 (which may be volatile memory) using, for example, DMA transfers. A non-volatile memory 148 (e.g. "flash" memory) is coupled to bus 138 in certain examples, which can provide storage for program instructions for an operating system of device 104, as well as program instructions for the various applications of device 104.

Figure 5:
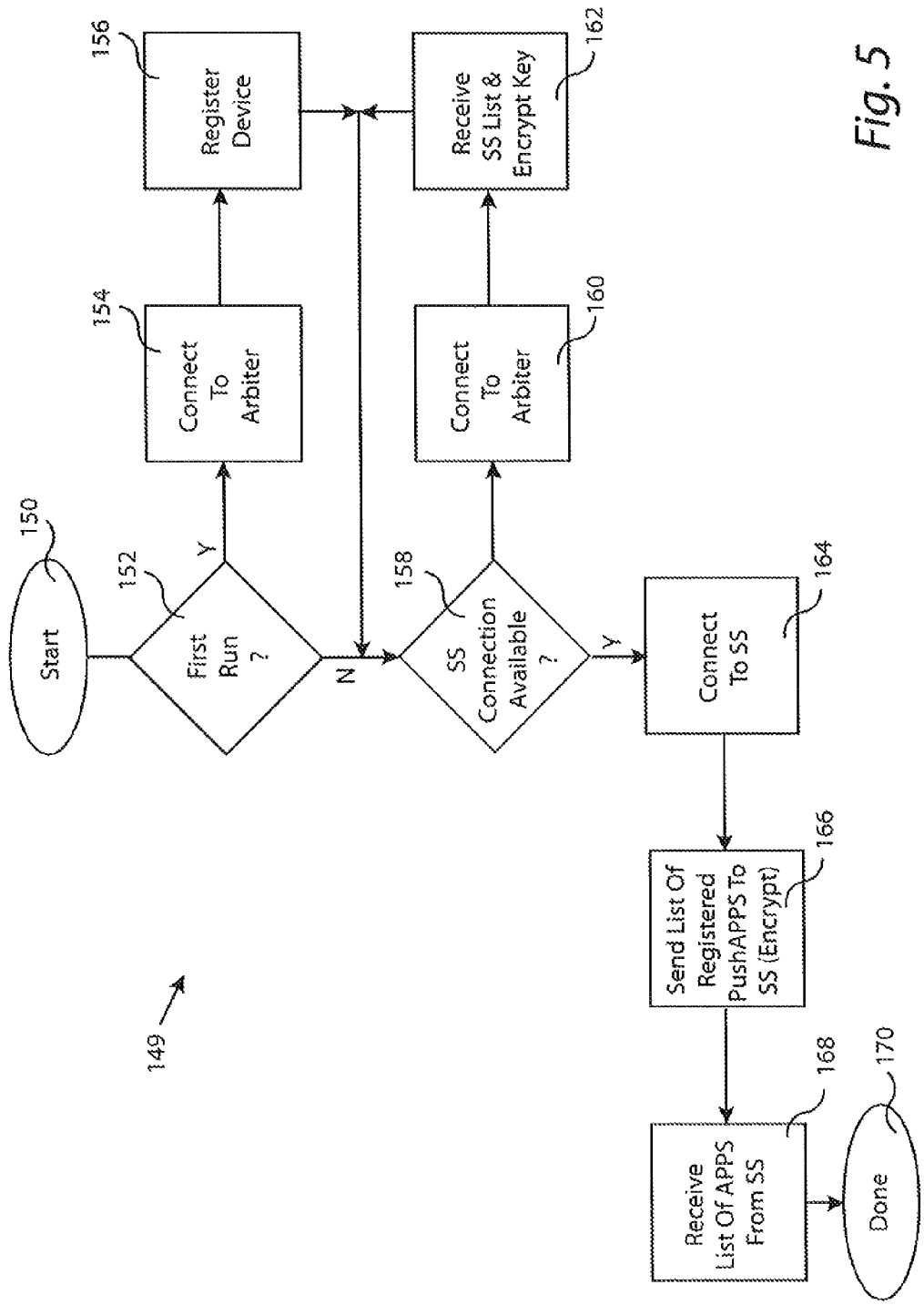
FIG. 5 is a flow diagram illustrating an example process implemented by a networkable device.

FIG. 5 is a flow diagram depicting, by way of example and not limitation, a process 149 which may be implemented by a device 104 of FIGS. 1 and 2. Process 149 begins at 150 and continues with an operation 152 which determines whether or not this is the first execution of the process 149 for the specific device 104 or for the specific combination of the application running on device 104 and the device 104 itself. If it is determined in operation 152 that this is the first execution, the process continues with operation 154 which establishes a connection via wide area network 102 between device 104 and arbiter server 112. In certain examples, a secure protocol such as HTTPS is used for this connection. Then in an operation 156 device 104 generates an identifier for itself that will identify it for the lifetime of that application install, and sends the device identifier to arbiter server 112 and device 104 receives a reply which includes in certain example embodiments a secure ID which is stored by device 104 and used thereafter for authentication, e.g. the secure ID is sent when communicating with push gateway 106, and it allows push gateway 106 to determine if the device's communication is authentic, thus preventing unauthorized devices from masquerading as this device 104.

The process then continues in an operation 158 which determines whether or not a connection to a socket server 116 is available. For example, if a list of socket servers 116 has not been received for the current 24 hour period, then the process continues with an operation 160 which connects to the arbiter server. Then in an operation 162 the device 104 receives a list including a list of addresses of socket servers 116 that are available for socket connection. This list may be ordered in ascending order from least busy to most busy, e.g. the socket server 116 which has the fewest connections is listed first. Device 104 also receives an encryption key that is to be used for the current 24 hour period (the process of FIG. 5 can be run at least once in the chosen time interval, e.g. 24 hours, in a non-limiting example). The process then continues with operation 158.

If it is determined in operation 158 that a socket server 116 connection is available, then the process continues with an operation 164 which establishes a socket connection to one of the socket servers given in the stored list of socket servers 116 that was obtained in operation 162. Then in an operation 166, a list of registered push apps on device 104 is encrypted using the stored encryption key that was obtained in operation 162. The encrypted list of registered push apps stored on device 104 is then sent to the socket server via the socket connection established in operation 164. The process then continues in an operation 168 which receives a list of push apps from the socket server via the socket connection established in operation 164. The process is then completed in an operation 170.

Figure 6:
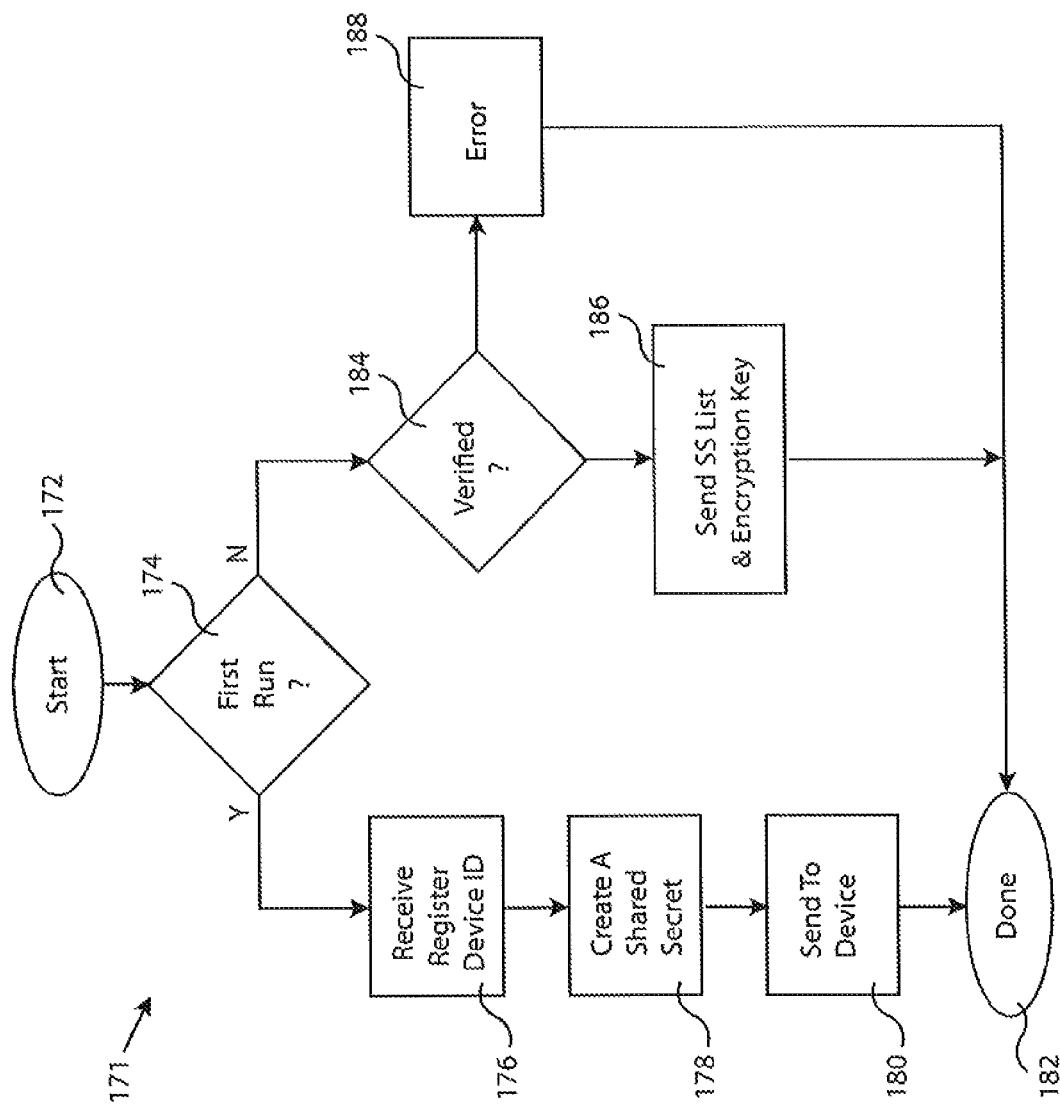
FIG. 6 is a flow diagram of an example process implemented by a server.

FIG. 6 is a flow diagram depicting, by way of example and not limitation, a process 171 which may be implemented by an arbiter server 112 of FIG. 2. For example, process 171 may be executed when a registration message or a request for daily information (e.g. encryption key and list of socket servers 116) is received from a device 104. Process 171 begins at 172, and continues with an operation 174 which determines whether the message received from a device 104 constitutes a "first run", e.g. the device 104 which sent the message to arbiter 112 is not yet registered. This is done by performing a lookup of the device ID in the message. If it is determined in operation 174 that the device is not registered, then the process continues in an operation 176 which received the device ID of device 104. Then in an operation 178, a secure ID is generated for device 104. This secure ID is private information because it could be used to "spoof" the device 104. The process continues in an operation 180 which sends the secure ID to the device using, for example, I-ITTPS protocol. The process is then completed at 182.

If, in this example, it is determined in operation 174 that this is not a "first run", the operation continues in an operation 184 which verifies the authenticity of the message. The verification operation may be done, by way of non-limiting example, by performing a look-up to determine if the device ID in the message matches the secure ID in the message. If it is determined in operation 184 that the message is verified, then the process continues in operation 186 which sends and encryption key and a list of addresses of socket servers 116 that are available for socket connection to the device 104. This list of connections may be, by way of non-limiting example, ordered in ascending order from least busy to most busy, e.g. the socket server 116 which has the fewest connections is listed first. In this example, the list may include the five least busy socket servers 116. The operation is then completed in at 182. If it is determined in operation 184 that the message is not authentic, the process continues in an operation 188 in which an error is reported and logged, and an error code may optionally be returned to the device 104 that sent the message. The process is then completed at 182.

FIG. 7 is a flow diagram depicting, by way of non-limiting example, a process 189 which may be implemented by worker servers 118 of FIG. 2. Process 189 of this example begins at 190 and continues in an operation 192 which monitors a queue in queue server 120 of FIG. 2. If a push message is detected in the queue, then the process continues in an operation 194 which performs a look-up of a device ID by accessing mapping server 114 of FIG. 2. If it is determined in operation 194 that the specified device 104 is presently connected, then the process continues in an operation 196 which encrypts the push message that is to be sent to the specified device 104. Then in an operation 198 the encrypted message is placed in a queue of queue server 120 of FIG. 2; this queue corresponds to a specific socket server 116 which is maintaining the connection to the specified device 104. This constitutes "pushing" the message to the device. It will be appreciated that the message is picked up from the queue by the corresponding socket server 116 and sent to the device 104 specified using the socket connection that was successfully established for this device 104. The process then continues with operation 192.

If it is determined in operation 192 that there are no messages available, the operation idles as indicated by 193. Note that there may be a short pause in execution associated with operation. 192 to prevent a high volume of requests to queue server 120. If it is determined in operation 194 that the specified device is not connected, then the process continues in an operation 200 which stores the message for later delivery. The process then continues with operation 192 to wait for a message to be available.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A push gateway including:
   a plurality of socket servers, each of which is configured to maintain socket server connections to one or more devices;
   a mapping server configured to develop a map of potential connections to the push gateway, wherein the map is developed based at least in part on information obtained from at least a portion of the plurality of socket servers, wherein the mapping server is configured to communicate with at least one socket server included in the plurality of socket servers;
   a plurality of worker servers, each of which is configured to identify a particular socket server maintaining a particular socket server connection to a particular device based at least in part on the map developed by the mapping server;
   a queue server configured to manage queues for messaging between the plurality of worker servers and the plurality of socket servers, wherein the queue server is configured to communicate with at least a portion of the worker servers and at least a portion of the socket servers; and
   an arbiter server configured to balance loads on at least some of the plurality of socket servers based at least in part on information obtained from the mapping server, wherein the obtained information is associated with the map of potential connections, and wherein the arbiter server is configured to communicate with the mapping server;

wherein the arbiter server is configured to provide a list of socket server connections to a device, wherein the list of socket server connections is derived at least in part from the map of potential connections, and wherein at least one message is pushed to the device via a socket server connection derived from the list of connections.

2. A push gateway as recited in claim 1, wherein the arbiter server is further configured to:
receive a device identifier associated with the device;
determine whether the device associated with the device identifier has been registered with the push gateway;
send a secure ID to the device over said network if in the event that the device was not registered with the push gateway;
verify a secure ID of the device in the event that the device was registered with the push gateway; and
send the list of connections in the event that the secure ID associated with the device was verified.

3. A push gateway as recited in claim 1, wherein the mapping server is further configured to store the developed map of potential connections.

4. The push gateway as recited in claim 1, wherein the list of socket server connections is sent to the device based at least in part on the map of potential connections.

5. The push gateway as recited in claim 1, wherein the arbiter server is further configured to connect the device to the push gateway at least in part by using a successful socket server connection derived from the list of socket server connections.

6. The push gateway as recited in claim 1, wherein the device comprises a mobile device.

7. The push gateway as recited in claim 1, wherein the list of socket server connections comprises a list of socket servers available for socket connection.

8. The push gateway as recited in claim 1, wherein the list of socket server connections is based at least in part on a determination of loads on the plurality of socket servers.

9. The push gateway as recited in claim 1, wherein the list of socket server connections is ordered based at least in part on loads on socket servers included in the list.

10. The push gateway as recited in claim 1, wherein the list of socket server connections includes addresses of socket servers available for socket connection.

11. The push gateway as recited in claim 1, wherein the arbiter server is further configured to provide an encryption key to the device.

12. The push gateway as recited in claim 11, wherein the arbiter server is further configured to refresh the encryption key periodically.

13. The push gateway as recited in claim 1, wherein the arbiter server is further configured to provide lists of socket server connections to the device periodically.

14. The push gateway as recited in claim 1, wherein the socket servers are configured to enqueue encrypted messages, via the queue server, from the device that are to be received by the plurality of worker servers.

15. The push gateway as recited in claim 1, wherein a socket connection is maintained at least in part by a keep-alive message.

16. The push gateway as recited in claim 1, wherein a socket server connected to the device is configured to receive a list of registered applications running on the device.

17. The push gateway as recited in claim 1, wherein the push message is encrypted.

* * * * *